UNITED STATES PATENT OFFICE.

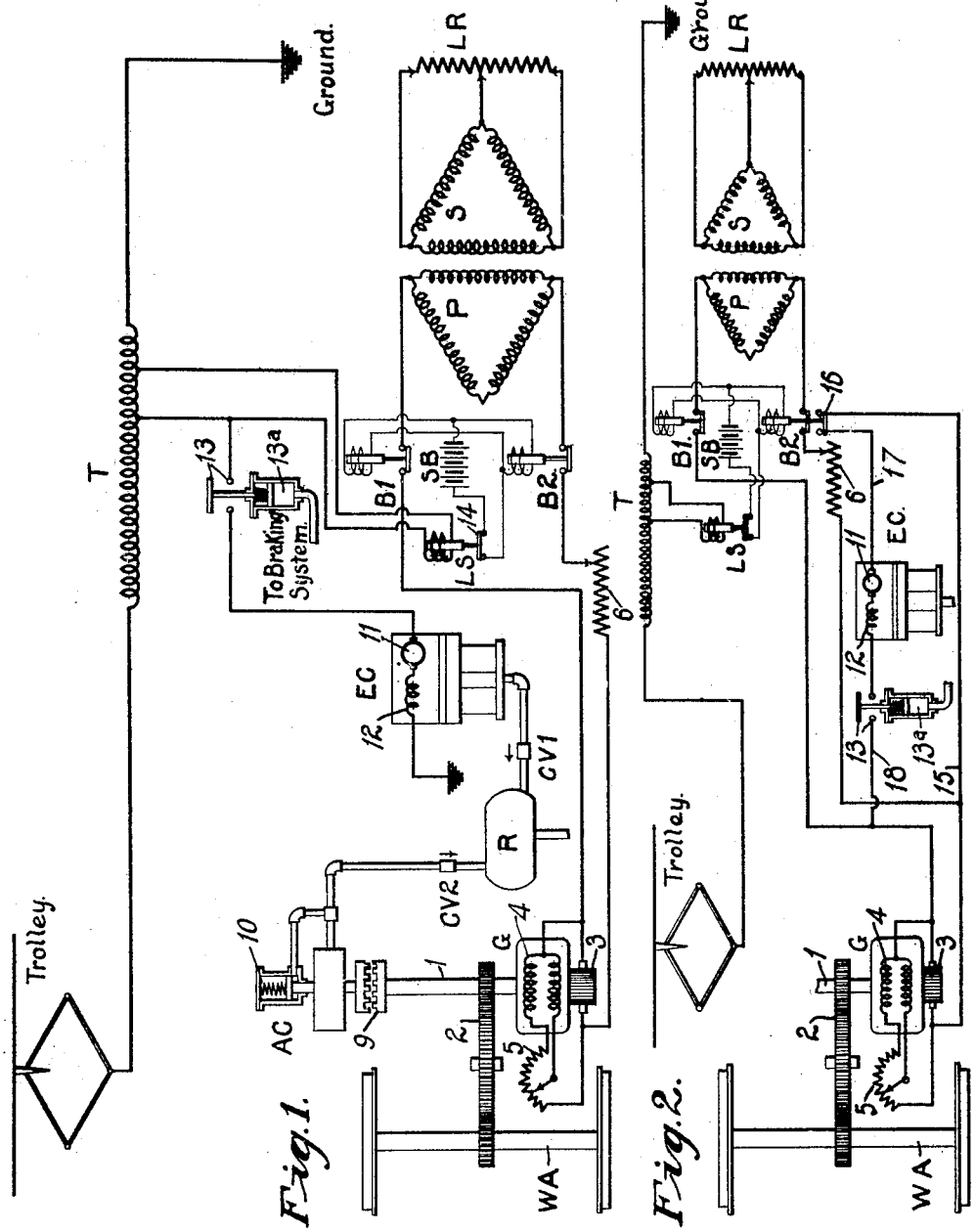

KARL A. SIMMON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,376,468.     Specification of Letters Patent.     Patented May 3, 1921.

Application filed December 10, 1914, Serial No. 876,441. Renewed August 16, 1918. Serial No. 250,231.

*To all whom it may concern:*

Be it known that I, KARL A. SIMMON, a citizen of the United States, and a resident of Edgewood Park, in the county of Allegheny and State of Pennsylvania, have invented a new and useful Improvement in Systems of Control, of which the following is a specification.

My invention relates to systems of control for electric motors, and it has special reference to the provision of emergency braking means for electric railway vehicles upon a failure of supply-circuit voltage or a similar contingency.

The object of my invention is to provide means of the above-indicated character for insuring both dynamic and continued air braking under the emergency conditions referred to.

More specifically stated, the object of my invention is to provide novel arrangements of electrically driven and wheel-axle driven air compressors, whereby, upon the failure of supply-circuit voltage, the momentum-driven vehicle may be automatically suitably retarded by means of dynamic or continued air braking or both.

According to one form of my invention, I provide, in connection with polyphase induction motors having a wound secondary and a coöperating speed-controlling resistor or liquid rheostat, for example, an air-compressor that is adapted to be electrically driven from the supply circuit, a second air-compressor that is adapted to be driven from a wheel axle, and an auxiliary generator that is likewise driven from a wheel-axle. The compressors are each preferably of slightly greater than half of the total capacity required, thus insuring continued air braking whenever the vehicle is at a standstill or whenever the supply-circuit voltage fails. Means are provided for automatically connecting the primary winding of the propelling motor to the auxiliary generator upon failure of supply-circuit energy, thereby converting the momentum-driven motor to a braking generator, the converted energy being absorbed in the resistor that is associated with the secondary winding of the motor.

In another form of my invention, I provide an air-compressor that is normally electrically driven from the supply circuit, but is adapted to be connected to the auxiliary generator upon the failure of supply-circuit energy, the dynamic braking occurring as before. Thus, in case of powerhouse, supply-circuit, or vehicle-circuit failure, the vehicle may be readily brought to rest or maintained at a safe speed when descending a grade.

In the accompanying drawing, Figure 1 is a diagrammatic view of an emergency braking system arranged in accordance with my invention, and Fig. 2 is a diagrammatic view of a modified form of the system shown in Fig. 1.

Referring to Fig. 1 of the drawing, the system here shown comprises a supply-circuit conductor marked "Trolley" and a return-circuit conductor marked "Ground"; a suitable transformer winding T which is connected across the supply-circuit conductors; a polyphase induction motor mounted upon a driving axle (not shown) and having a primary winding P and a coöperating secondary winding S, with which a suitable speed-controlling resistor or liquid rheostat LR or other suitable translating device is variably associated; an idler wheel-axle WA of an electric railway vehicle upon which the apparatus shown on the drawing is supposed to be suitably mounted and which is mechanically unconnected to the driving axle; an electrically driven air compressor EC of familiar form which is adapted to be connected to the transformer winding T under predetermined conditions; an axle-driven air compressor AC which is adapted to be connected to the wheel-axle, either directly or through suitable power transmitting means, such as a jack-shaft 1 and a train of gearing 2; an air reservoir R which is connected to both of the compressors EC and AC, through suitable check valves CV1 and CV2, respectively; an auxiliary generator G which may be mounted upon the jack-shaft 1 or may be driven from the wheel axle in any other suitable manner; a switch or relay LS of the "no-voltage release" type which has its actuating coil connected across a predetermined portion of the transformer winding T; a plurality of switches B1 and B2, of a familiar electromagnetic type for connecting the primary winding P of the propelling motor to the armature of the generator G under emergency conditions; and a suitable source of energy, such as a storage battery SB, for energizing the actuating coils of switches B1 and B2 under predetermined conditions, as hereinafter described.

The auxiliary generator G preferably has its armature 3 mounted upon the jack-shaft 1, as mentioned above, and is provided with a suitable shunt field winding 4, the strength of which may be varied by means of a suitable resistor 5. A variable resistor 6 may be inserted in the circuit connecting the generator G and the primary winding P of the propelling motor for varying the rate of dynamic braking, as hereinafter set forth.

The axle-driven air compressor AC is adapted to be connected to the jack-shaft 1 by means of a suitable clutch 9, when the pressure in the air braking system decreases to a predetermined value, for which a governor 10 for the compressor is set, as will be understood. The electrically driven compressor EC may be provided with a suitable armature winding 11 and a coöperating series-connected field winding 12, the windings being connected to the transformer winding T when the coöperating contact members 13 of a governor 13ª assume a predetermined lower position upon the decrease of air pressure in the braking system to a predetermined value. The two compressors AC and EC are preferably each of a capacity slightly greater than half of the total capacity required for pneumatically braking the vehicle, thereby insuring a continued supply of air for use either when the supply-circuit energy fails or when the vehicle is at a standstill. Preferably, the governor 10 of the axle-driven compressor is adjusted to actuate the clutch 9 at a pressure approximately 10% lower than the pressure at which the governor 13ª is adapted to act, thereby insuring that the axle-driven compressor will be employed to its fullest extent in supplying pressure to the air braking system, whenever the electrically driven air-compressor is inoperative due to lack of line potential or is of insufficient capacity to supply the demand of the braking system.

Inasmuch as the control system for effecting the normal propelling operation of the induction motor may be of any well-known and suitable type and, moreover, is not essential to the operation of my present invention, I have not deemed it necessary to show or describe any particular type of accelerating system. It will be understood that the single-phase energy absorbed from the transformer winding T may be converted into polyphase energy, for supplying the propelling induction motor, by means of a suitable phase converter, and that the secondary winding resistor LR may be employed in effecting acceleration, in accordance with usual practice.

Assuming the parts of the system to occupy the respective positions shown, the emergency braking operation thereof may be set forth as follows: Upon the failure of supply-circuit voltage, the switch or relay LS, which is maintained in its raised position whenever the supply-circuit energy traverses the transformer winding T, assumes its lower position shown on the drawing, whereupon a circuit is completed from one terminal of the storage battery SB through coöperating stationary and movable contact members 14 of the relay LS and the actuating coils of the switches B1 and B2 to the other terminal of the battery. The switches B1 and B2 are thus closed to connect the primary winding P of the propelling motor, through the variable resistor 6, across the armature 3 of the auxiliary generator G. The propelling motor is thereupon converted into a braking generator, the energy of the vehicle as its speed decreases, being absorbed electrically by the translating device or resistor LR that is associated with the secondary winding S of the propelling motor. The rate of retardation may be varied by manipulating the resistor 6. If it is desired to concurrently employ air braking of the vehicle, a suitable pressure will be maintained in the reservoir R by the operation of the axle-driven compressor AC, the electrically driven compressor EC, of course, being temporarily inoperative by reason of the failure of supply-circuit voltage.

Referring now to Fig. 2 of the drawing, it will be noted that the difference from the control system illustrated in Fig. 1 resides in the omission of the axle-driven compressor AC with its accessories, and in the adaptability of the electrically driven compressor EC for connection to the generator G under emergency conditions, as described below. The compressor EC is preferably adapted for normal operation from the transformer winding T in the same manner as shown in Fig. 1, but for the sake of simplicity and clearness, the necessary connections have been omitted from Fig. 2.

Again, assuming that the parts of the system shown in Fig. 2 occupy the respective positions illustrated, the emergency braking operation of the system upon a failure of the supply-circuit energy may briefly be described as follows: The relay LS and the switches B1 and B2 are adapted to operate in the same manner as that described in connection with the system of Fig. 1, and, in addition, a circuit is established from one terminal of the armature 3 of the auxiliary generator G through conductor 15, coöperating stationary and movable contact members 16 of the switch B2, in its closed position, conductor 17, the armature 11 and the field winding 12 of the compressor, the coöperating contact members 13 of the governor 13ª, provided the latter occupies its low-pressure position, and the conductor 18 to the other side of the generator armature 3. The compressor EC may thus be driven from the generator G as long as the vehicle is in motion, irrespective of the failure of supply-circuit voltage.

It will be observed that the systems set forth provide means for automatically effecting either dynamic or continued air braking, or both, of a momentum-driven vehicle under emergency conditions, whereby the vehicle may be readily brought to rest or maintained at a suitable speed when descending a grade.

I do not wish to be restricted to the specific circuit connections or arrangement of parts herein set forth, as modifications thereof may be effected within the spirit and scope of my invention. I, therefore, desire that only such limitations shall be imposed as are indicated in the appended claims.

I claim as my invention:

1. In an electric vehicle, the combination with a supply circuit and an air compressor operated from the supply circuit, of a second air compressor, means for effecting dynamic braking, and means for operating said second air compressor by the momentum of the vehicle.

2. In an electric railway vehicle, the combination with an air storage reservoir and a source of energy for operating the vehicle, of an electrically-driven compressor communicating with said reservoir and operated from said source of energy, a second compressor adapted to be driven from the vehicle wheels and also communicating with said reservoir, each of said compressors having a capacity of approximately half of the total capacity required and means for effecting dynamic braking of the vehicle.

3. In an electric railway vehicle, the combination with means for effecting dynamic braking when the vehicle is momentum-driven, of an air-storage reservoir, an electrically driven compressor communicating with said reservoir, and a second compressor adapted to be driven from the vehicle wheels and also communicating with said reservoir, each of said compressors having a capacity of approximately half of the total capacity required, whereby both dynamic and continued air braking are assured in case of failure of the supply-circuit voltage.

4. In a system of control, the combination with a supply circuit, and an electric vehicle-propelling motor, of an auxiliary generating dynamo-electric machine driven from the vehicle wheels, an air-storage reservoir, a motor-driven compressor intermittently energized from said supply circuit and communicating with said reservoir, a second compressor also communicating with said reservoir and adapted to be mechanically connected to said auxiliary machine under predetermined conditions, each of said compressors having a capacity of approximately half of the total capacity required, and means dependent upon a predetermined variation in the supply-circuit voltage for connecting said machine to energize said motor to effect dynamic braking of the vehicle, whereby both dynamic and continued air braking are assured in case of failure of the supply-circuit voltage.

5. In a system of control, the combination with a supply circuit, and an electric vehicle-propelling motor, of an auxiliary generator driven from the vehicle wheels, an air-storage reservoir, a motor-driven compressor communicating with said reservoir and adapted to be intermittently energized from said supply circuit, when the reservoir pressure falls below a predetermined value, a second compressor also communicating with said reservoir and adapted to be mechanically connected to said generator when the pressure falls below a second predetermined value, each of said compressors having a capacity of approximately half of the total capacity required, and means dependent upon a predetermined decrease of supply-circuit voltage for connecting said machine to energize said motor to effect dynamic braking of the vehicle, whereby both dynamic and continued air braking are assured in case of failure of the supply-circuit voltage.

6. In a control system, the combination with a supply circuit, and an electric vehicle-propelling motor, of an auxiliary generating dynamo-electric machine driven from the vehicle wheels, a motor-driven compressor adapted to be connected to said supply circuit, and means dependent upon a predetermined variation in the supply-circuit voltage for connecting said machine to energize said motor to effect dynamic braking of the vehicle.

7. In an electric vehicle, means for effecting dynamic braking, an electrically operated air compressor for effecting air braking, a second auxiliary air compressor, and means for operating said second air compressor by the momentum of the vehicle.

8. In an electric vehicle, the combination with a propelling motor and a fluid-brake system having fluid compressors associated therewith, of means for selectively operating said compressors in accordance with the fluid pressure in the fluid-brake system, and means for effecting dynamic braking by said propelling motor.

9. In an electrical vehicle, the combination with a supply circuit, a propelling motor, and means associated with said motor for effecting dynamic braking of the vehicle, of an air-brake system, air compressors associated with the air-brake system and operated by the momentum of the vehicle and by energy received from the supply circuit for maintaining pressure in said air-brake system, and means for selectively operating said compressors in accordance with the fluid pressure in the air-brake system.

10. In an electrical vehicle, the combination with a supply circuit, a propelling motor, and means associated with said motor for effecting dynamic braking of the vehicle, of an air-brake system and air compressors operated respectively by the momentum of the vehicle and by energy received from the line circuit for maintaining pressure in said air-brake system.

11. In an electrical vehicle, the combination with a supply circuit, an air compressor operated from the supply circuit and a second air compressor adapted to be operated by the momentum of the vehicle, of means for effecting dynamic braking of the vehicle and means for selectively operating said air compressors.

12. In an electric vehicle, the combination with a propelling dynamo-electric machine, of an auxiliary dynamo-electric machine driven from the vehicle wheels, means dependent upon predetermined machine electrical conditions for connecting said auxiliary machine to energize said propelling machine to effect dynamic braking of the vehicle, and means for preventing such connection except during the existence of said predetermined conditions.

13. In a system of control, the combination with a supply circuit and a dynamo-electric machine, of a second dynamo-electric machine, means dependent upon a predetermined variation in the supply-circuit voltage for connecting said machines in circuit to effect dynamic braking, and means for preventing such connection except during said predetermined variation.

14. The combination with a dynamo-electric machine, of an auxiliary dynamo-electric machine, and means dependent upon predetermined conditions for connecting said auxiliary machine to energize said first machine to effect dynamic braking, said means being independent of the means for controlling said first machine.

15. In a system of control, the combination with a supply circuit, and a main dynamo-electric machine, of an auxiliary dynamo-electric machine in circuit with said main machine, means for normally maintaining the second-named circuit open, and means for closing said second-named circuit upon a predetermined variation in the voltage of said supply circuit.

16. The combination with a source of energy and a dynamo-electric machine connected thereto, of a second dynamo-electric machine, and a relay in circuit with said source for automatically connecting said machines in a dynamic braking circuit during predetermined conditions in said source.

17. In a system of control, the combination with a supply circuit, and an electric motor, of a dynamo-electric machine in circuit with said motor, a switch for normally maintaining the second-named circuit open, and a relay controlled by predetermined variations in the supply-circuit voltage for closing said switch.

18. In a system of control, the combination with a supply circuit, and an electric vehicle - propelling motor, of an auxiliary generating dynamo-electric machine driven from the vehicle wheels, and means dependent upon a predetermined decrease in supply-circuit voltage and independent of the rotation of said propelling motor for connecting said machine to energize said motor to effect dynamic braking of the vehicle.

19. In a system of control, the combination with a supply circuit, an electric vehicle-propelling motor having primary and secondary windings, and a translating device connected to one of said windings, of an auxiliary generator mechanically unconnected to said motor and driven from the vehicle wheels, a resistor, and means dependent upon a predetermined variation of the supply-circuit voltage for connecting said generator, said resistor and one of said windings to cause the other winding to send current through said translating device for dynamically braking the vehicle.

20. In an electric vehicle, the combination with a dynamo-electric machine, of an auxiliary dynamo - electric machine mechanically unconnected to said first machine and driven from the vehicle wheels, and means dependent upon predetermined main circuit conditions for connecting said auxiliary machine to energize said propelling machine to effect dynamic braking of the vehicle.

21. In an electric vehicle, the combination with a propelling dynamo-electric machine and a source of energy therefor, of an auxiliary dynamo-electric machine driven from the vehicle wheels, means for connecting said propelling machine to said source, and means independent of said connecting means for connecting said machines in a dynamo braking circuit during predetermined conditions.

22. The combination with a vehicle, of means for automatically effecting both dynamic braking and fluid-braking of said vehicle under predetermined electrical operating conditions.

23. The combination with a vehicle having an axle, of a fluid compressor driven from said axle and means controlled by said axle for effecting dynamic braking of said vehicle.

24. In an electric vehicle, a propelling alternating-current motor, an air compressor, and means operated by the momentum of the vehicle for operating said air compressor and for effecting dynamic braking of the vehicle.

25. In an electric vehicle having an axle, an air compressor connected to said axle, and means operated by the momentum of the vehicle for operating said air compressor and for effecting dynamic braking of the vehicle.

26. The combination with a propelling dynamo-electric machine, an auxiliary dynamo-electric machine, and an air compressor, of means dependent upon predetermined machine electrical conditions for connecting said auxiliary machine to energize said propelling machine to effect dynamic braking of the vehicle, and means dependent upon predetermined compressor operating conditions for operating said air compressor.

27. In a system of control, the combination with a supply circuit, and an electric vehicle-propelling motor, of an auxiliary generator driven from the vehicle wheels, means dependent upon a predetermined decrease in supply-circuit voltage for connecting said generator to energize said motor to effect dynamic braking of the vehicle, and means driven by the vehicle for effecting air-braking.

28. In a control system, the combination with an electric vehicle-propelling motor, of an auxiliary generating dynamo-electric machine driven from the vehicle wheels, an air compressor adapted to be driven from the vehicle wheels, and means dependent upon a predetermined variation in the supply-circuit voltage for connecting said machine to energize said motor to affect dynamic braking of the vehicle.

29. In an electric vehicle having an axle, the combination with a propelling motor, and a generator and an air compressor connected to said axle, of means for connecting said generator to said motor to effect dynamic braking of said vehicle, and means for effecting air braking by said compressor.

30. In a system of control, the combination with a supply circuit, an electric vehicle having an axle, a vehicle-propelling motor, and a fluid-brake system having a fluid compressor associated therewith, of means independent of said supply circuit for mechanically connecting said compressor to said axle when the pressure in said fluid system is reduced in a predetermined degree, and means for effecting dynamic braking by said propelling motor.

31. In an electric vehicle, the combination with a propelling dynamo-electric machine and a source of current therefor, of means connected to said source for braking the vehicle and means for braking the vehicle upon failure of voltage in said source.

32. In an electric vehicle, the combination with means for automatically effecting dynamic braking under predetermined electrical operating conditions when the vehicle is momentum driven, of a compressor mechanically connected to the vehicle wheels.

33. In an electric vehicle, the combination with a supply circuit, and means for effecting dynamic braking of the vehicle, of an air-brake system, means operated by the momentum of the vehicle for maintaining pressure in said air-brake system, and other means operated by energy received from said supply circuit for maintaining pressure in said air-brake system.

34. In a system of control, the combination with a supply circuit, an electric vehicle-propelling motor, and a motor-driven air-compressor operated from the supply circuit, of an auxiliary dynamo-electric machine driven from the vehicle wheels, and means dependent upon a predetermined variation in the supply-circuit voltage for connecting said machine to energize said motor to effect dynamic braking of the vehicle.

35. In an electric vehicle, the combination with an electrically driven fluid compressor, of a second fluid compressor adapted to be driven by the vehicle.

36. In an electric vehicle, the combination with a supply circuit, of an air-brake system including two compressors, means operated by the momentum of the vehicle for maintaining pressure in said air-brake system through the medium of one compressor, and other means operated by energy received from said supply circuit for maintaining pressure in said air-brake system through the medium of the other compressor.

37. In an electric vehicle, the combination with a fluid-brake system having fluid compressors associated therewith, of means for selectively operating said compressors in accordance with the fluid pressure in said fluid-brake system.

38. In an electric railway vehicle, the combination with an air-storage reservoir, of an electrically driven compressor communicating with said reservoir and a second compressor adapted to be driven from the vehicle wheels and also communicating with said reservoir, each of said compressors having a capacity of approximately one-half of the total capacity required.

39. The combination with a vehicle, of an electrically driven fluid compressor and a mechanically driven fluid compressor for braking said vehicle, and means for rendering one or both of said compressors effective to brake said vehicle under predetermined conditions.

40. The combination with an electric vehicle having an axle, a driving motor therefor and a source of energy for said motor, of a fluid compressor adapted to be driven from said source, a fluid compressor adapted to be driven from said axle and a generator adapted to be supplied with energy from said axle.

41. The combination with an electric vehicle having an axle, of an alternating-current motor therefor having primary and secondary windings, a translating device in circuit with said secondary windings, a source of energy, means for connecting said primary windings to said source, a fluid compressor adapted to be driven from said source, a fluid compressor adapted to be driven from said axle, a generator adapted to be driven from said axle, and means for connecting said generator to said primary windings.

42. In an electric vehicle, the combination with a propelling dynamo-electric machine, an auxiliary dynamo-electric machine driven from the vehicle wheels, and a motor-driven air compressor, of means dependent upon predetermined main-circuit conditions for connecting said auxiliary machine to energize certain windings of said propelling machine to effect dynamic-braking of the vehicle and for operating said air compressor.

43. In a system of control, the combination with a supply circuit, an air compressor, and an electric vehicle-propelling motor, of an auxiliary generating dynamo-electric machine driven from the vehicle wheels, and means dependent upon a predetermined decrease in supply-circuit voltage for connecting said machine to energize certain windings of said motor to effect dynamic-braking of the vehicle and for operating said air compressor.

44. In a system of control, the combination with a supply circuit, an electric vehicle-propelling motor having primary and secondary polyphase windings, and a translating device connected to the secondary winding, of an auxiliary generator driven from the vehicle wheels, an air compressor associated with said generator, and means dependent upon a predetermined decrease in supply-circuit voltage for connecting said generator to energize said primary winding to cause the secondary winding to generate through said translating device for dynamically-braking the vehicle and for operating said air compressor.

45. In a system of control, the combination with an alternating-current supply circuit, an air compressor, an electric vehicle-propelling motor having primary and secondary polyphase windings for effecting acceleration of the vehicle, and a resistor connected to the secondary winding, of an auxiliary direct-current generator driven from the vehicle wheels, and means dependent upon a failure of supply-circuit voltage for connecting said generator to energize said primary winding to cause the secondary winding to generate through said resistor for dynamically-braking the vehicle and for operating said air compressor.

46. In a control system, the combination with a supply circuit, and an electric vehicle-propelling motor, of an auxiliary generator driven from the vehicle wheels, a motor-driven compressor adapted to be energized from said generator under predetermined conditions of fluid pressure, and means dependent upon a predetermined decrease in supply-circuit voltage for connecting said generator to energize certain windings of said motor to effect dynamic-braking of the vehicle.

47. In a system of control, the combination with a supply circuit, an electric vehicle-propelling motor having primary and secondary polyphase windings, and a translating device connected to the secondary winding, of an auxiliary direct-current generator driven from the vehicle wheels, a motor-driven compressor adapted to be energized from said generator under predetermined conditions of fluid pressure, and means dependent upon a failure of supply-circuit voltage for connecting said generator to energize said primary winding to cause the secondary winding to generate through said translating device for dynamically-braking the vehicle.

48. In a system of control for an electric vehicle, the combination with a supply circuit, a propelling motor, and a motor-driven air compressor operated from the supply circuit, of means for effecting dynamic-braking and for operating said air compressor with energy generated independently of said motor and by the momentum of the vehicle.

49. The combination with a source of energy, a fluid compressor having a driving motor and a generator, of a switch for connecting said generator to said driving motor under predetermined conditions of said source.

In testimony whereof I have hereunto subscribed my name this 30th day of Nov., 1914.

KARL A. SIMMON.

Witnesses:
 G. R. IRWIN,
 B. B. HINES.